United States Patent [19]
Breckenfeld et al.

[11] Patent Number: 4,898,134
[45] Date of Patent: Feb. 6, 1990

[54] CRANKCASE SEAL ARRANGEMENT FOR TWO CYCLE ENGINE

[75] Inventors: Paul W. Breckenfeld, Winthrop Harbor; George L. Broughton, Zion, both of Ill.

[73] Assignee: Outboard Marine Corporation, Waukegan, Ill.

[21] Appl. No.: 316,154

[22] Filed: Feb. 27, 1989

[51] Int. Cl.$^4$ .................. F16J 15/32; F16F 15/00
[52] U.S. Cl. ............................ 123/195 R; 277/53; 277/178
[58] Field of Search ............. 123/195 R, 195 H, 73 R, 123/74 AE, 195 S; 74/595; 277/178, 56, 53

[56] References Cited

U.S. PATENT DOCUMENTS

| | | | |
|---|---|---|---|
| 2,885,249 | 5/1959 | Payne | 277/154 |
| 3,356,377 | 12/1967 | Voitik | 277/40 |
| 3,455,565 | 7/1969 | Jepsen | 277/138 |
| 3,917,286 | 11/1975 | Loyd | 277/37 |
| 3,941,396 | 3/1976 | Bailey et al. | 277/134 |
| 4,013,298 | 3/1977 | Bjerk | 277/75 |
| 4,320,724 | 3/1982 | Takada et al. | 123/196 R |
| 4,615,531 | 10/1986 | Green | 277/216 |
| 4,645,215 | 2/1987 | Fuchs et al. | 277/9 |
| 4,667,967 | 5/1987 | Deuring | 277/53 |
| 4,693,216 | 9/1987 | Ampferer et al. | 123/195 R |
| 4,753,201 | 6/1988 | Fukuo et al. | 123/195 R |

Primary Examiner—David A. Okonsky
Attorney, Agent, or Firm—Michael, Best & Friedrich

[57] ABSTRACT

An engine block comprising a first crankcase-defining member including a first semi-cylindrical surface having an end and extending about a first center, and also including a first shoulder extending radially outwardly from the end of the first semi-cylindrical surface, a second crankcase-defining member fixedly connected to the first crankcase-defining member and including a second semi-cylindrical surface located in generally co-planar facing relation to the first semi-cylindrical surface having an end and extending about a second center located in spaced relation to the first center, and also including a second shoulder extending radially outwardly from the end of the second semi-cylindrical surface, a crankshaft supported by the engine block and including a crankcase-defining disc including a cylindrical surface in spaced and generally co-planar facing relation to the first and second semi-cylindrical surfaces and including therein an annular groove, a first seal member located in the annular groove and having a side surface, an outer surface in sealing engagement with the semi-cylindrical surface of one of the crankcase-defining members, and an end surface engaging the shoulder on the other of the crankcase-defining members, and a second seal member located in the annular groove and having a side surface in sealing engagement with the side surface of the first sealing member, an outer surface in sealing engagement with the semi-cylindrical surface of the other of the crankcase-defining members, and an end surface engaging the shoulder on the one of the crankcase-defining members.

8 Claims, 1 Drawing Sheet

CRANKCASE SEAL ARRANGEMENT FOR TWO CYCLE ENGINE

BACKGROUND OF THE INVENTION

The invention relates generally to internal combustion engines and, more particularly, to two stroke internal combustion engines in which each cylinder has associated therewith a separate individual crankcase.

In the past, such separate crankcases have been sealed against loss of pressure by preventing fluid flow from the crankcases and between the crankshaft and the engine block and crankcase cover by use of a single sealing member between a crankshift disc and a cylindrical surface formed by the engine block and by a crankcase cover. In practice, the engine block and crankcase cover were manufactured with relatively tight tolerances and the engine block and crankcase covers were individually selected for marriage with each other to produce, as nearly as practical as possible, an annular concentric cylindrical sealing surface adapted to cooperate with a single sealing member carried in a groove on the crankcase disc.

As a result of tight tolerances, and the practical requirement for matching or marrying engine blocks and crankcase covers to obtain as nearly as possible a truly geometric cylindrical sealing surface, the past practice has been excessively expensive.

Attention is also directed to the following United States Patents:

| | | |
|---|---|---|
| 2,885,249 | Payne | May 5, 1959 |
| 2,356,377 | Voitik | December 5, 1967 |
| 3,455,565 | Jepsen | July 15, 1969 |
| 4,615,531 | Green | October 7, 1986 |

SUMMARY OF THE INVENTION

The invention provides an internal combustion engine comprising an engine block comprising a first crankcase-defining member including a first semi-cylindrical surface extending about a first center, and also including a first shoulder extending from the first semi-cylindrical surface, a second crankcase-defining member fixedly connected to the first crankcase defining member and including a second semi-cylindrical surface located in generally co-planar facing relation to the first semi-cylindrical surface, and extending about a second center located in spaced relation to the first center, and also including a second shoulder extending from the second semi-cylindrical surface, a crankshaft supported by the engine block and including a crankcase-defining disc including a cylindrical surface in spaced and generally co-planar facing relation to the first and second semi-cylindrical surfaces and including therein an annular groove, a first seal member located in the annular groove and having an outer surface in sealing engagement with the semi-cylindrical surface of one of the first and second crankcase-defining members and an end surface engaging the shoulder on the other of the first and second crankcase-defining members, and a second seal member located in the annular groove and in sealing engagement with the first sealing member, and having an outer surface in sealing engagement with the semi-cylindrical surface of the other of the first and second crankcase-defining members, and an end surface engaging the shoulder on the one of the first and second crankcase-defining members.

In one embodiment of the invention, the first crankcase-defining member includes a first flat surface which extends from the first semi-cylindrical surface and which defines the first shoulder, the second crankcase-defining member includes a second flat surface which extends from the second semi-cylindrical surface and which defines the second shoulder, the first and second flat surfaces are sealingly engaged with each other, and the first and second centers are located in the plane of engagement of the first and second flat surfaces.

The invention also provides an internal combustion engine comprising an engine block comprising a first crankcase-defining member including a first semi-cylindrical surface having an end and extending about a first center, and also including a first mating surface extending from the first semi-cylindrical surface and defining a first shoulder, a second crankcase-defining member fixedly connected to the first crankcase defining member and including a second semi-cylindrical surface having an end, and extending about a second center and also including a second mating surface extending from the second semi-cylindrical surface and defining a second shoulder, and means fixedly connecting together the first and second crankcase-defining members with the first and second flat surfaces in mating engagement in a plane of engagement, and with the first and second centers in spaced relation in the plane, and with the first and second semi-cylindrical surfaces in generally co-planar facing relation to each other.

The invention also provides an internal combustion engine including an engine block comprising a first crankcase-defining member including a first semi-cylindrical surface extending about a first center, and also including a first shoulder extending from the first semi-cylindrical surface, a second crankcase-defining member fixedly connected to said first crankcase-defining member and including a second semi-cylindrical surface located in generally co-planar facing relation to the first semi-cylindrical surface, and extending about a second center located in spaced relation to the first center, and also including a second shoulder extending from the second semi-cylindrical surface, a crankshaft supported by the engine block and including a crankcase-defining disc including a cylindrical surface in spaced and generally co-planar facing relation to the first and second semi-cylindrical surfaces and including therein an annular groove having spaced parallel first and second side surfaces, a first seal member located in the annular groove and comprising a first split washer having a first side surface in sealing engagement with one of the first and second side surfaces of the groove, a second side surface, an outer surface in sealing engagement with the semi-cylindrical surface of one of the first and second crankcase-defining members, and an end surface engaging the shoulder on the other of the first and second crankcase-defining members, and a second seal member located in the annular groove and comprising a second split washer having a first side surface in sealing engagement with the other of the first and second side surfaces of the groove, a second side surface in sealing engagement with the side surface of the first sealing member, an outer surface in sealing engagement with the semi-cylindrical surface of the other of the first and second crankcase-defining members, and an end surface engaging the shoulder on the one of the first and second crankcase-defining members.

In one embodiment of the invention, one of the first and second crankcase-defining members is fabricated of plastic.

Other features and advantages of the invention will become apparent to those skilled in the art upon review of the following detailed description, claims, and drawings.

THE DRAWINGS

Figure 1:
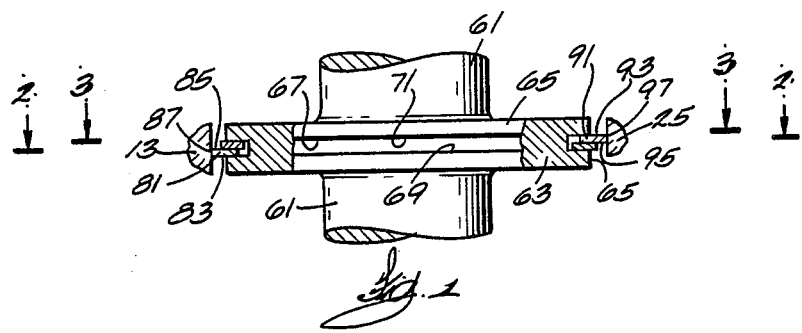
FIG. 1 is a partially schematic and partially sectioned view of a portion of an internal combustion engine embodying various of the features of the invention. In particular, FIG. 1 fragmentarily illustrates a crankcase defining seal provided by the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Shown in the drawings is an internal combustion engine 11 including an engine block defining one or more cylinders (not shown) and comprising (See FIGS. 2 and 3) a first crankcase-defining member 13 including a semi-cylindrical surface 15 extending at a first radius about a first center 17 and having ends 19 and 21 terminating in a first flat surface 23 constituting, in part, a sealing surface for engagement with a crankcase cover.

The engine 11 also includes the just mentioned crankcase cover which comprises a second crankcase-defining member 25 including a second semi-cylindrical surface 27 located in generally co-planar relation to the first semi-cylindrical surface 15 and extending at a second radius equal to said first radius and about a second center 29 in spaced relation to said first center 17 and having ends 31 and 33 terminating in a second flat surface 35 which constitutes, in part, a sealing surface for engagement with the flat surface 23 of the first crankcase-defining member 13, either with or without an intervening gasket (not shown).

The engine 11 also includes means for fixedly assembling the first and second crankcase-defining members 13 and 25 to each other with the first and second flat surfaces 23 an 35 in engagement with each other (with or without an intervening gasket) and with said first and second centers 17 and 29 being offset or spaced from each other in the plane of the engagement of the first and second flat surfaces 23 and 35 so as to thereby define a first shoulder 41 at the end 19 of the first semi-cylindrical surface 15 and a second shoulder 43 at the end 33 of the second semi-cylindrical surface 27. While other constructions can be employed, in the disclosed construction, such means comprises a plurality of bolts 45.

The engine 11 also includes a crankshaft 61 which can be suitably supported by one or both of the crankcase-defining members 13 and 25, such as by suitable journals or bearings (not shown). The crankshaft 61 includes one or more discs 63 (only one of which is shown) which serve to assist in defining one or more crankcases so that each cylinder has associated therewith its own individual and separate crankcase. The discs 63 can also serve as counter-weights. Each of the discs 63 includes an outer cylindrical surface 65 in facing generally co-planar relation to the semi-cylindrical surfaces 15 and 27 of the first and second crankcase-defining members 13 and 25.

Included in the outer cylindrical surface 65 is an annular groove 67 which has spaced side surfaces 69 and 71.

Figure 2:
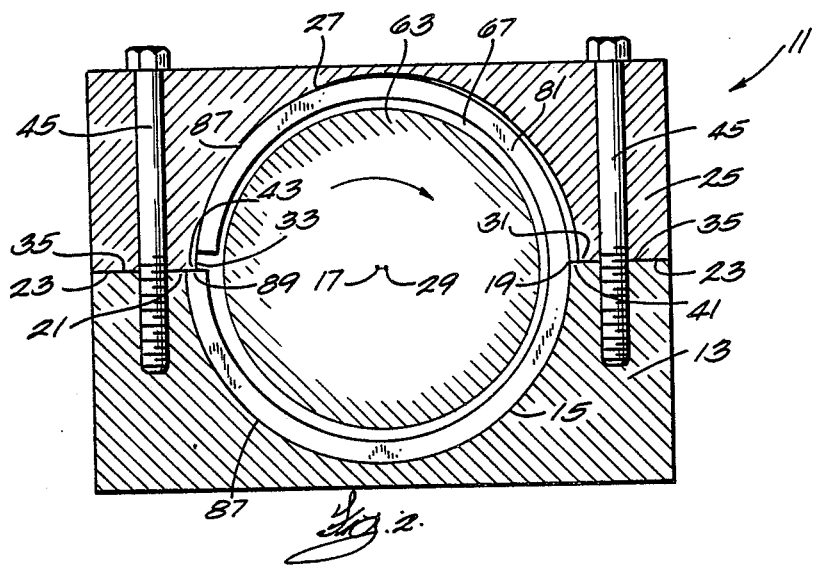
FIG. 2 is an enlarged sectional view taken along line 2—2 of FIG. 1.
Figure 3:
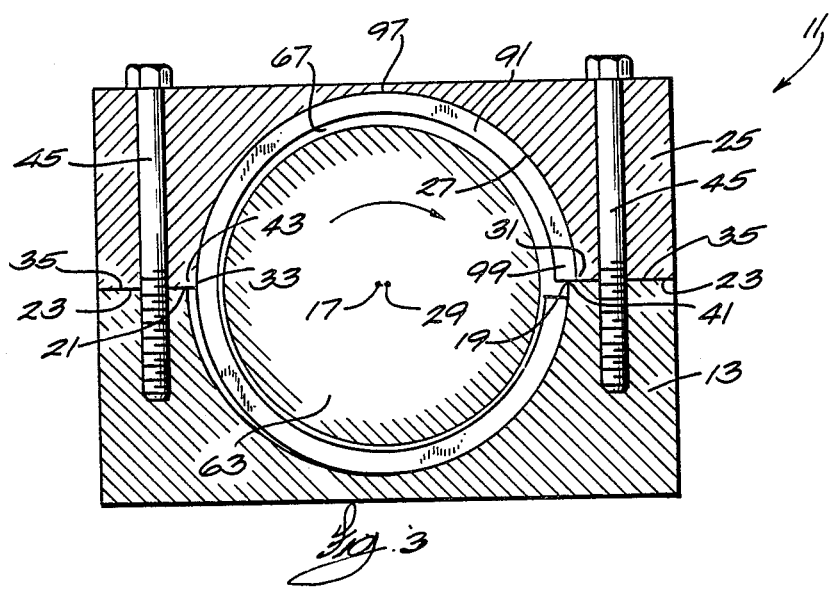
FIG. 3 is an enlarged sectional view taken along line 3—3 of FIG. 1.

The engine 11 also includes (See FIG. 2) a first sealing member in the form of an annular split washer 81 which is located in the annular groove 67, which has a first side surface 83 sealingly engagable with the side surface 69 of the groove 67, a second side surface 85, an outer generally cylindrical surface 87 in close sealing engagement with at least a portion of the semi-cylindrical surface 15 of first crankcase-defining member 13, and an end 89 engaging the shoulder 43 on the second crankcase-defining member 25 to prevent rotation of the first sealing member or split washer 81 relative to the crankcase-defining members 13 and 25 in response to rotation of the crankshaft 61 in the clockwise direction as shown in FIGS. 2 and 3.

The engine 11 also includes (See FIG. 2) a second sealing member in the form of an annular split washer 91 which is located in the annular groove 67, which has a first side surface 93 sealingly engagable with the the side surface 71 of the groove 67, a second side surface 95 sealingly engagable with the second side surface 85 of the first split washer 81, an outer generally cylindrical surface 97 sealingly engagable with at least a portion of the semi-cylindrical surface 27 of the second crankcase-defining member 25, and an end 99 engaging the shoulder 41 on the first crankcase-defining member 13 to prevent rotation of the second sealing member or split washer 91 relative to the crankcase-defining members 13 and 25 in response to rotation of the crankshaft 61 in the clockwise direction as shown in FIGS. 2 and 3.

As a consequence of the foregoing construction, the sealing members 81 and 91 engage each other, and the groove side walls 69 and 71, and the crankcase defining members 13 and 25 to substantially prevent fluid flow from the individual crankcases and between the crankshaft 61 and the crankcase-defining members 13 and 25. The use of the disclosed construction advantageously avoids the expense of marrying a specific crankcase cover to a specific engine block in order to obtain an essentially cylindrical sealing surface for location in spaced relation to a crankcase disc. Accordingly, expensive machining is avoided and tolerance sensitivity can be less severe. Also as a consequence, the crankcase cover or second crankcase-defining member 27 can be fabricated of plastic. Consequently, the cost of sealing and defining the individual crankcases is much reduced.

Various of the features of the invention are set forth in the following claims.

We claim:

1. An internal combustion engine comprising an engine block comprising a first crankcase-defining member including a first semi-cylindrical surface extending about a first center, and also including a first shoulder extending from said first semi-cylindrical surface, a second crankcase-defining member fixedly connected to said first crankcase defining member and including a second semi-cylindrical surface located in generally co-planar facing relation to said first semi-cylindrical surface, and extending about a second center located in spaced relation to said first center, and also including a second shoulder extending from said second semi-cylindrical surface, a crankshaft supported by said engine block and including a crankcase-defining disc including a cylindrical surface in spaced and generally co-planar facing relation to said first and second semi-cylindrical surfaces and including therein an annular groove, a first seal member located in said annular groove and having an outer surface in sealing engagement with said semi-cylindrical surface of one of said first and second crankcase-defining members and an end surface engaging said shoulder on said other of said first and second crankcase-defining members, and a second seal member located in said annular groove and in sealing engagement with said first sealing member, and having an outer surface in sealing engagement with said semi-cylindrical surface of said other of said first and second crankcase-defining members, and an end surface engaging said shoulder on said one of said first and second crankcase-defining members.

2. An internal combustion engine in accordance with claim 1 wherein said first crankcase-defining member includes a first flat surface which extends from said first semi-cylindrical surface and which defines said first shoulder, wherein said second crankcase-defining member includes a second flat surface which extends from said second semi-cylindrical surface and which defines said second shoulder, wherein said first and second flat surfaces are sealingly engaged with each other, and wherein said first and second centers are located in the plane of engagement of said first and second flat surfaces.

3. An internal combustion engine in accordance with claim 1 wherein said annular groove has first and second spaced radially extending side surfaces, wherein said first includes a side surface in sealing engagement with one of said side surfaces of said groove, and wherein said second includes a side surface in sealing engagement with the other of said side surfaces of said groove.

4. An internal combustion engine in accordance with claim 1 wherein one of said first and second crankcase-defining members is fabricated of plastic.

5. An internal combustion engine comprising an engine block comprising a first crankcase-defining member including a first semi-cylindrical surface having an end and extending about a first center, and also including a first mating surface extending from said first semi-cylindrical surface and defining a first shoulder, a second crankcase-defining member including a second semi-cylindrical surface having an end and extending about a second center, and also including a second mating surface extending from said second semi-cylindrical surface and defining a second shoulder, and means fixedly connecting together said first and second crankcase-defining members with said first and second flat surfaces in mating engagement in a plane of engagement, and with said first and second centers in spaced relation in said plane, and with said first and second semi-cylindrical surfaces in generally co-planar facing relation to each other.

6. An internal combustion engine in accordance with claim 5 wherein one of said first and second crankcase-defining members is fabricated of plastic.

7. An internal combustion engine comprising an engine block comprising a first crankcase-defining member including a first semi-cylindrical surface having an end and extending about a first center, and including a first shoulder extending radially outwardly from said end of said first semi-cylindrical surface, a second crankcase-defining member including a second semi-cylindrical surface having an end and extending about a second center, and also including a second shoulder extending radially outwardly from said end of said second semi-cylindrical surface, means fixedly connecting said first and second crankcase-defining members in assembled relation to each other with said first and second semi-cylindrical surfaces located in generally co-planar facing relation to each other and with said first and second centers in spaced relation to each other, a crankshaft supported by said engine block and including a crankcase-defining disc including a cylindrical surface in spaced and generally co-planar facing relation to said first and second semi-cylindrical surfaces and including therein an annular groove having spaced parallel first and second surfaces, a first seal member located in said annular groove and comprising a split washer having a first side surface in sealing engagement with one of said first and second surface of said groove, a second side surface, an outer surface in sealing engagement with said semi-cylindrical surface of one of said first and second crankcase-defining members, and an end surface engaging said shoulder on the other of said first and second crankcase-defining members to prevent rotation of said first seal member relative to said crankcase-defining members, and a second seal member located in said annular groove and comprising a split washer having a first side surface in sealing engagement with the other of said first and second side surfaces of said groove, a second side surface in sealing engagement with said second side surface of said first sealing member, an outer surface in sealing engagement with said semi-cylindrical surface of said other of said first and second crankcase-defining members, and an end surface engaging said shoulder on said one of said first and second crankcase-defining members to prevent rotation of said second seal member relative to said crankcase-defining members.

8. An internal combustion engine in accordance with claim 7 wherein one of said first and second crankcase-defining members is fabricated of plastic.

* * * * *